US 11,580,788 B2

(12) United States Patent
Klohr (10) Patent No.: US 11,580,788 B2
(45) Date of Patent: Feb. 14, 2023

(54) APPARATUS FOR DETERMINING A PASSING TIME OF A PASSIVE RFID SPORTS TIMING TRANSPONDER (71) Applicant: RACE RESULT AG, Pfinztal (DE)

(72) Inventor: Nikias Klohr, Stutensee (DE)

(73) Assignee: RACE RESULT AG, Pfinztal (DE)

( * ) Notice: Subject to any disclaimer, the term of this patent is extended or adjusted under 35 U.S.C. 154(b) by 111 days.

(21) Appl. No.: 17/108,178

(22) Filed: Dec. 1, 2020

(65) Prior Publication Data
US 2021/0166498 A1 Jun. 3, 2021

(30) Foreign Application Priority Data
Dec. 3, 2019 (EP) .................... 19213045

(51) Int. Cl.
*G07C 1/28* (2006.01)
*H04W 4/029* (2018.01)
(Continued)

(52) U.S. Cl.
CPC ........... *G07C 1/28* (2013.01); *G06K 7/10316* (2013.01); *H01Q 1/525* (2013.01); *H01Q 9/0407* (2013.01);
(Continued)

(58) Field of Classification Search
CPC ........ G07C 1/28; G07C 1/24; G06K 7/10316; G06K 7/10356; H01Q 1/525;
(Continued)

(56) References Cited

U.S. PATENT DOCUMENTS 5,737,280 A * 4/1998 Kokubo .................... G01P 3/66
368/2
8,145,448 B2 * 3/2012 Vincenzini ............... G07C 1/24
702/158
(Continued)

FOREIGN PATENT DOCUMENTS

CN 106529630 A 3/2017
DE 20 2017 100 671 U1 5/2017
WO WO-2022109419 A1 * 5/2022 ........... G06F 21/554

OTHER PUBLICATIONS

Examination Report Received for European Application No. 19213045. 8, dated Nov. 9, 2020, 6 pages.
(Continued)

*Primary Examiner* — Nam V Nguyen
(74) *Attorney, Agent, or Firm* — Foley & Lardner LLP (57) ABSTRACT

An apparatus for determining a passing time of a passive RFID sports timing transponder includes a housing for protecting the apparatus; an RFID reader unit connected to an RFID antenna for remotely determining an identity and a passing time of the transponder; a location unit for determining a location of the apparatus; a mobile communication unit connected to a mobile communication antenna for transmitting the identity and the passing time of the transponder and the location of the apparatus to a processing unit; and a communication unit for communicating with another similar apparatus in an immediate spatial vicinity to synchronize operation of the RFID reader unit and an RFID reader unit of the similar apparatus to avoid interference. The RFID reader unit, the RFID antenna, the location unit, the mobile communication unit and the neighbor communication unit are integrated in a common printed circuit board that is mounted within the housing.

22 Claims, 4 Drawing Sheets (51) Int. Cl.
*G06K 7/10* (2006.01)
*H01Q 1/52* (2006.01)
*H01Q 9/04* (2006.01)
*H04B 5/00* (2006.01)
*H04W 64/00* (2009.01)

(52) U.S. Cl.
CPC .......... *H04B 5/0062* (2013.01); *H04W 4/029* (2018.02); *H04W 64/00* (2013.01)

(58) Field of Classification Search
CPC .. H01Q 9/0407; H01Q 1/2216; H04B 5/0062; H04W 4/029; H04W 64/00
USPC ................................................ 340/10.1, 10.5
See application file for complete search history.

(56) References Cited

U.S. PATENT DOCUMENTS

| | | | |
|---|---|---|---|
| 9,330,203 | B2 | 5/2016 | Rosen et al. |
| 9,972,141 | B2* | 5/2018 | Doval .................... G01S 13/04 |
| 10,580,223 | B2* | 3/2020 | Cranfill ................... H04W 4/80 |
| 2004/0006445 | A1* | 1/2004 | Paek ....................... G04F 10/00 |
| | | | 702/178 |
| 2009/0213700 | A1* | 8/2009 | Conant .................... G04F 8/08 |
| | | | 368/113 |
| 2009/0289116 | A1 | 11/2009 | Copeland et al. |
| 2010/0088023 | A1* | 4/2010 | Werner .................... G09B 5/02 |
| | | | 455/566 |
| 2013/0166049 | A1* | 6/2013 | Werner ................... G01S 19/19 |
| | | | 700/91 |
| 2013/0285794 | A1* | 10/2013 | Hansen .............. H04N 1/00185 |
| | | | 340/8.1 |
| 2013/0300542 | A1* | 11/2013 | Hansen .............. G06K 7/10425 |
| | | | 340/10.1 |
| 2015/0302235 | A1 | 10/2015 | Kelly et al. |
| 2018/0326285 | A1 | 11/2018 | Petersen et al. |

OTHER PUBLICATIONS

European Search Report for related European Patent Application No. EP 19213045.8 dated Jun. 17, 2020, 21 pages.
Mbacke Abdoul Aziz et al: "A Survey of RFID Readers Anticollision Protocols," IEEE Journal of Radio Frequency Identification, IEEE, vol. 2, No. 1, Mar. 1, 2018, pp. 38-48, XP011683604, DOI: 10.1109/JRFID.2018.2828094 [retrieved on May 10, 2018] p. 44.

\* cited by examiner

APPARATUS FOR DETERMINING A PASSING TIME OF A PASSIVE RFID SPORTS TIMING TRANSPONDER

CROSS REFERENCE TO RELATED APPLICATION

This application claims the priority benefit of the EP Patent Application Number 19213045.8, filed on Dec. 3, 2019, entitled "Apparatus for Determining a Passing Time of a Passive RFID Sports Timing Transponder," which his hereby incorporated by reference in its entirety to the maximum extent allowable by law.

FIELD

The present invention relates to an apparatus for determining a passing time of a passive RFID sports timing transponder. The present invention further relates to a system for timing a sports event.

BACKGROUND

In the field of timing at sports events, for example running events, marathons, bicycle races, skiing races, car races, horse races or comparable events, timing of participants' start, finish, and split times plays an important role. In prevailing timing systems, oftentimes a person, a vehicle or an animal, whose time is to be measured, carries a radio element (sports timing transponder, in particular an active or passive RFID tag) for noncontact, automated timing. Runners, for instance, may carry radio elements that are attached to shoe laces or to a bib number for being attached to the participant's shirt or pants or also to a sports equipment like a bike, a cart or a rifle etc. In the case of cycling events, it is possible to attach respective radio elements to the handlebar of a bicycle. At start, finish and split time positions along a track, measuring points are provided to detect the presence of the radio element. For this purpose, a measuring point comprises a corresponding antenna and data processing means to process the received data and to determine a passing time, i.e. a moment in time at which the radio element passes the measuring point. Usually, the determined passing times for the participants are then communicated to a central evaluation point.

In this context, a sports timing transponder particularly designates a radio element that is able to transmit as well as to receive radio signals. Herein, a sports timing transponder particularly refers to a passive RFID tag that has no integrated energy source. Upon passing a measuring point, the sports timing transponder is activated, i.e. read out, by a corresponding RFID reader. Based on this read or based on multiple reads a passing time is determined by a processor connected to the RFID reader. Usually, the passive RFID sports timing transponder transmits its identity when being activated by the RFID reader. Current sports timing systems usually include a suitcase-sized apparatus (decoder) including in particular the RFID reader. This decoder is connected to a corresponding RFID-antenna. The antennas are usually ground antennas that are integrated in cable channels or positioned at a side of a race track on a tripod. Apart from the RFID reader, which is usually an RFID reader originally intended for logistics applications, current apparatuses include at least a battery, a processing module and different options for communication. Relevant drawbacks of current solutions are high costs, weight, size and energy consumption. This is particularly relevant for sports events at remote locations or for capturing split times in difficult-to-access places. Usually, the number of split time positions along a track is rather limited due to the size, weight and cost of the timing system.

In view of this, there exists a need for cost-efficient, small, lightweight and easily installable timing systems that could preferably be powered by a battery for the duration of a sports event. Such timing systems could then be installed along the race track for providing split times. Additionally, such timing systems could be installed in locations that cannot be accessed with current timing systems such as mountain trails or the like.

SUMMARY

In view of the above, the present invention addresses the problem of providing a timing system that fulfills these requirements. In particular, it is desired to provide a small, lightweight and easily installable apparatus for determining a passing time of a passive RFID sports timing transponder.

To solve this problem, a first aspect of the present invention relates to an apparatus for determining a passing time of a passive RFID sports timing transponder, comprising:
  a housing for protecting the apparatus from environmental effects;
  an RFID reader unit connected to an RFID antenna for remotely determining an identity and a passing time of the sports timing transponder upon passing the apparatus;
  a location unit for determining a location of the apparatus;
  a mobile communication unit connected to a mobile communication antenna for transmitting the identity and the passing time of the sports timing transponder and the location of the apparatus to a remote processing unit; and
  a neighbor communication unit for communicating with another similar apparatus in an immediate spatial vicinity to synchronize operation of the RFID reader unit and an RFID reader unit of the other similar apparatus to avoid interference, wherein
  the RFID reader unit, the RFID antenna, the location unit, the mobile communication unit and the neighbor communication unit are integrated within the housing.

In another aspect, the present invention relates to a system for timing a sports event, comprising:
  a passive RFID sports timing transponder;
  an apparatus as described above; and
  a remote processing unit for receiving the identity and the passing time of the sports timing transponder and the location of the apparatus, and for evaluating passing times of participants in a sports event based on the identity, the passing time and the location.

Preferred embodiments of the invention are defined in the dependent claims. It shall be understood that the claimed system has similar and/or identical preferred embodiments as the claimed apparatus, in particular as defined in the independent claims and as disclosed herein.

The apparatus of the present invention can be installed next to a race track at a sports event to determine passing times of passing participants carrying sports timing transponders. For instance, the apparatus can be positioned next to a race track in a marathon event at a split time position. Upon determination of the identity and the passing time of the sports timing transponder both pieces of information are combined with the location of the apparatus and communicated to a remote processing unit. This remote processing unit could, e.g., be an internet server or also a central timing instance that could then be accessed by the participants of the sports event to obtain their passing times.

In the apparatus an RFID reader, a location unit and a mobile communication unit, an RFID antenna and a neighbor communication unit are integrated within a housing. Due to this integration size and weight of the apparatus are considerably reduced in comparison to current systems and the installation can be considerably facilitated. This makes it possible that the apparatus is used for determining passing times of sports timing transponders at locations that were not accessible with previous sports timing systems. In addition, the integration of the different components within a single housing allows for an efficient manufacturing so that costs are reduced. In comparison to previous integration approaches in other fields, the present invention provides the determination of a passing time and can therefore be used for the timing of sports events.

In larger sports events, often large numbers of participants and large numbers of RFID sports timing transponders pass a measuring point within a short time span. It occurs that body parts of other participants shadow a transponder from an RFID reader. However, all or almost all transponders have to be detected at the measuring point in order to provide a meaningful sports timing measurement. Due to the integration of the RFID antenna with the other parts of the apparatus in a single housing, it is usually not possible to place the antenna in a position that allows a line-of-sight connection to all sports timing transponders. Also, the distance between the RFID antenna and the sports timing transponders can be high (in particular in comparison to previous approaches using ground antennas) making the detection difficult and resulting in a required high sensitivity of the reader.

The neighbor communication unit and the synchronization functionality of the apparatus makes it possible that two or more similar apparatuses can be used within immediate spatial vicinity without disturbing or interfering with one another. The apparatuses can be placed in different positions along the race track to optimize the probability that every sports timing transponder is detected by at least one of the apparatuses. Thus, in spite of the small design and the integration within a single housing, a high detection rate can be obtained due to the use of the neighbor communication unit.

In a preferred embodiment, the RFID reader unit and the RFID antenna are integrated in a common printed circuit board that is mounted within the housing. Preferably, a ground plane of the RFID antenna is integrated in the common printed circuit board. Since the different radio components can interfere with one another, the conventional approach would be to make use of multiple printed circuit boards. The integration of the different components within a common housing and in a common printed circuit board results in a reduced size and weight of the apparatus. By making use of a ground plane being integrated in the common printed circuit board, the size of the apparatus can be further reduced. Additionally, it becomes possible to cost-efficiently manufacture the RFID antenna.

In a preferred embodiment, the RFID antenna is a bistatic antenna and includes a transmit antenna and a receive antenna that are mounted on the common printed circuit board, preferably on an opposite side of the common printed circuit board of the RFID reader unit. The RFID antenna is preferably a bistatic patch antenna including a transmit antenna patch and a receive antenna patch. The RFID reader unit is mounted on one side of the common printed circuit board, the RFID antenna is mounted on the other side. The use of a bistatic patch antenna allows an efficient circuit design. Further, a high sensitivity can be obtained, resulting in an optimized detection range. The use of patch antennas allows for an efficient positioning of the RFID antenna on the common printed circuit board. A high sensitivity and a cost-efficient manufacturing becomes possible.

In a preferred embodiment, a geometric arrangement, in particular a distance and an alignment, of the transmit antenna and the receive antenna are chosen to minimize crosstalk between the transmit antenna and the receive antenna at an activation frequency of the sports timing transponder. By choosing a distance and an alignment of the two antennas in consideration of the RFID activation frequency of the sports timing transponder, it becomes possible to minimize crosstalk and thereby maximize the sensitivity and the detection range (optimized signal-to-noise ratio). An efficient signal processing is possible.

In a preferred embodiment, the RFID reader unit includes a carrier cancellation circuitry to cancel remaining crosstalk between the transmit antenna and the receive antenna. By additionally including a carrier cancellation circuitry, dynamic noise effects can be compensated and the sensitivity can be further improved. For instance, if the apparatus is used close to a metal object, this metal object might have an influence on crosstalk between the transmit antenna and the receive antenna. By making use of a carrier cancellation circuitry, effects resulting from the positioning of the apparatus can be compensated for and the remaining crosstalk can be cancelled. Signal processing is facilitated.

In a preferred embodiment, the neighbor communication unit is a short-distance communication unit, preferably a 2.4 GHz transceiver. The use of a short-distance communication unit allows for an efficient synchronization between apparatuses in communication range. In particular, a broadcast-based communication becomes possible.

In a preferred embodiment, the neighbor communication unit is configured to broadcast a deactivation message when deactivating the RFID reader unit. Further, an activation message is broadcasted if no activation message is received from the other similar apparatus within an individually determined wait time. Still further, the RFID reader unit is activated upon receipt of a deactivation message from the other similar apparatus when an activation message is sent. Preferably, the individually determined wait time is determined based on a number of other similar apparatuses within communication range of the neighbor communication unit and/or a duration since the last broadcast of an actuation message. This synchronization algorithm has the effect that a high-duty cycle in which most of the time at least one of the apparatuses has its RFID reader unit activated is obtained resulting in a high detection rate. The different apparatuses communicate with one another to synchronize their operation so that a high detection rate is obtained. In a preferred embodiment, the mobile communication unit includes a band-stop filter being located in a feed line of the mobile communication antenna to filter out an activation frequency of the sports timing transponder. The band-stop filter preferably includes two band-pass filters and a hybrid coupler to function as a notch filter. The band-pass filters are preferably surface acoustic wave (SAW) filters. By filtering out the activation frequency of the sports timing transponder, it becomes possible to maximize a signal-to-noise ratio. This results in an improved communication connection of the mobile communication unit. The band-stop filter is implemented by making use of two band-pass filters and a hybrid coupler. This allows providing the functionality of a notch filter which explicitly filters out a predetermined frequency. In particular, a frequency of the high-power RFID signal needed to activate an ultra-high frequency (UHF-) RF ID transponder can be filtered out. By making use of the band-stop filter it becomes possible to reduce the size of the apparatus since the mobile communication unit and its antenna can be positioned in spatial vicinity of the RFID antenna. In addition, a good quality of the communication connection can be assured.

In a preferred embodiment, the mobile communication antenna and the RFID antenna are integrated in a common printed circuit board and positioned versus one another on the common printed circuit board so that crosstalk is minimized. By deliberately determining positions and orientations of the mobile communication antenna and the RFID antenna, the size of the apparatus can be further reduced. It becomes possible to position the two antennas closer to one another albeit maintaining a sufficient signal quality when both antennas are simultaneously operated.

In a preferred embodiment, the apparatus comprises at least one spacer element for defining a distance between the portion of the housing covering the RFID antenna and the RFID antenna. The at least one spacer element is preferably a protruding part of the housing. The housing is usually manufactured from a plastic material but has to be sufficiently robust against environmental effects. Such a plastic material can have a detuning effect on the RF ID antenna. In particular, this effect can be pronounced when the housing is wet or the like. In order to minimize this effect, a spacer element can be used to define a distance between the housing and the RFID antenna. This spacer element allows to compensate for the detuning effect in a corresponding carrier cancellation circuitry and/or in a respectively chosen geometric arrangement of the transmit antenna and the receive antenna and their ground plane. The use of a protruding part of the housing makes an efficient manufacturing possible.

In a preferred embodiment, the apparatus further comprises an acceleration sensor for detecting an orientation of the apparatus. The RFID reader unit and/or the location unit are configured to enter a stand-by or a power-down mode when the acceleration sensor detects that the apparatus is put into a predefined stand-by orientation. The acceleration sensor allows sensing an orientation of the apparatus. When the apparatus is not used, it can be put in a certain orientation, which then results in an automatic deactivation of at least one of the RFID reader unit and the location unit. In other words, the apparatus can be put in a stand-by mode with considerably reduced power consumption by only placing the apparatus in a predefined stand-by position which can be detected by the acceleration sensor. This has the effect that power can be saved. An efficient handling is made possible resulting in a longer lifetime without recharging a battery of the apparatus.

In a preferred embodiment, the apparatus comprises an attachment element that is foldable versus the housing and that can be locked in at least two different positions by means of a locking mechanism. This locking mechanism preferably includes a distance member that can be hinged to at least one corresponding rest element of the attachment element to define a distance between the attachment element and the housing. The use of a foldable attachment element makes it possible to easily set up the apparatus at a desired position along a race track (measuring point) of a sports event. The installation is facilitated.

In a preferred embodiment, the attachment element can be locked in a first position in which, when the attachment element is placed on the ground, a stand is formed for the apparatus to orient the RFID antenna in an inclined upward direction. The attachment element can further be locked in a second position in which, when the attachment element is fixed to a vertical support object, a hanging is formed to orient the RFID antenna in an inclined downward direction. In the first position, the apparatus can be placed on the ground at a side of the race track to determine passing times. In the second position, the apparatus can be attached to a support object such as a street lamp, a tree or a traffic light. This positioning often allows a good view on the sports timing transponders of the participants of the sports event. A good view results in a high detection rate. By allowing the attachment element to be locked in two positions, a flexible application of the apparatus is obtained. The same attachment element allows making use of the two different positions. The setup of the apparatus is facilitated. It is to be understood that it is also possible to accommodate different further positions, i.e. to realize multiple upward and/or downward angles.

In a preferred embodiment, the attachment element includes at least one magnet for attaching the apparatus to a metallic object. Said magnet is preferably configured to attach to a metallic or a magnetic counterpart of the housing to fix the attachment element to the housing in a rest position. The use of at least one magnet allows for an efficient installation at metallic objects, such as street lamps or traffic lights. A simple and fast installation becomes possible. If the magnet is additionally connectable to a counterpart of the housing, the apparatus can be put in a rest position in which it can be transported or stored without consuming too much space.

In a preferred embodiment, the apparatus comprises a battery for powering the apparatus in a charging circuitry for charging the battery. It is particularly advantageous if the apparatus is completely self-sufficient. By additionally including a charging circuitry, it becomes possible to efficiently put the apparatus to use without requiring further equipment.

Herein, a sports timing transponder particularly refers to a passive RFID tag that has no integrated energy source but is activated to send out its identity by an RFID reader. A sports event is particularly a running event such as a marathon or the like. However, a sports event can also be a bike race, a car race, a ski race, a horse race, a swimming competition etc. An identity of a sports timing transponder can particularly be an alphanumeric number of the RFID tag. This alphanumeric identifier is programmed to the transponder upon manufacturing. The determination of a passing time may include activating and reading the identity of the sports timing transponder multiple times. The time of the strongest read could then, e.g., be considered to represent the passing time.

DESCRIPTION OF THE DRAWINGS

These and other aspects of the invention will be apparent from and elucidated with reference to the embodiments described hereinafter. In the following drawings

DETAILED DESCRIPTION

Figure 1:
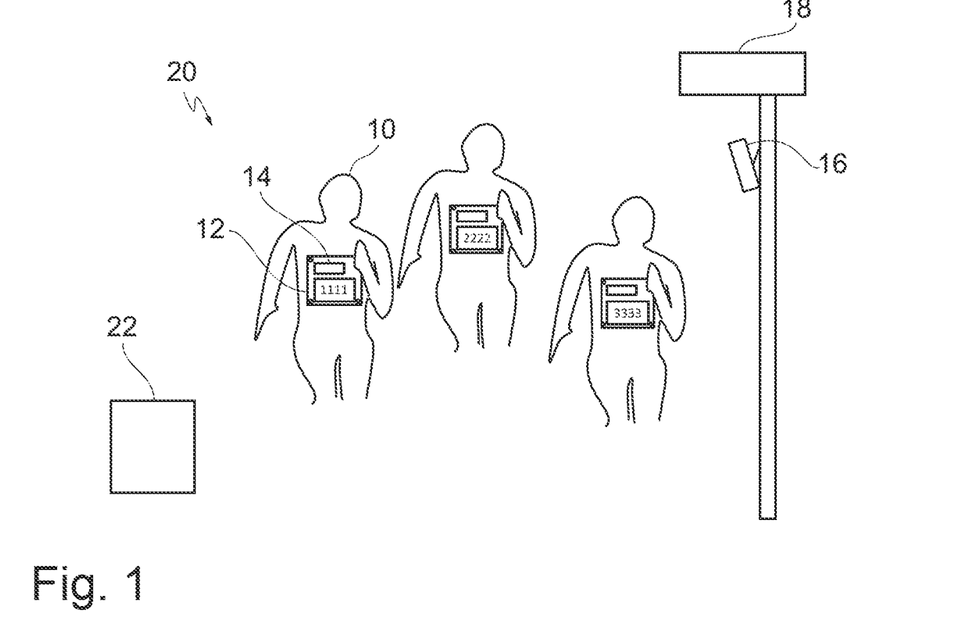
FIG. 1 shows a schematic illustration of participants of a sports event having a passing time measured by a system of the present invention.

In FIG. 1, a plurality of participants 10 participating in a sports event (also referred to as athletes) is schematically illustrated. The participants 10 may particularly be runners in a running event such as a marathon or the like. A participant 10 is identified by means of a bib number 12 corresponding to a participant ID. The bib number 12 can, e.g., be attached to the participant's shirt. Attached to the bib number 12 is a passive RFID sports timing transponder 14. This sports timing transponder 14 is used for carrying out a measurement of a passing time and for determining the identity via RFID when the participant 10 crosses the start or finish line or passes a split time measuring point.

In order to carry out the measurement of the passing time, the present invention proposes to make use of an apparatus 16 for determining a passing time of a passive RFID sports timing transponder. In the illustrated example, the apparatus 16 is attached to a street lamp 18 or a pole of the street lamp 18. The apparatus 16 of the present invention integrates all necessary components for reading out the sports timing transponder 14 and transmitting a corresponding information for further evaluation to a processing unit within a single housing. In particular, the apparatus 16 of the present invention does not require the use of an external antenna to be laid out on the ground on the race track.

The concept of the present invention is to provide an apparatus 16 that is small and lightweight and can thus be easily transported and installed. The apparatus 16 of the present invention particularly makes the determination of split times easier and more efficient in comparison to previous approaches to sports timing that require different components and in particular a larger antenna. The apparatus 16 of the present invention thereby makes a dense determination of passing times at a plurality of locations possible.

Thereby, a tracking of locations of sports timing transponders along a race track in a sports event becomes possible.

In addition to the apparatus 16 and the sports timing transponder 14, a system 20 of the present invention further includes a remote processing unit 22. The remote processing unit 22 is in communication with the apparatus 16 and receives the identity and the passing time of the sports timing transponder as well as the location of the apparatus. The remote processing unit 22 can, e.g., be embodied in the form of an internet server that is accessible by the participants 10 of the race event in order to provide their passing times (or positions) and to evaluate the sports event. It is also possible that the remote processing unit 22 is installed at a central location such as the start or finish area of the sports event.

Figure 2:
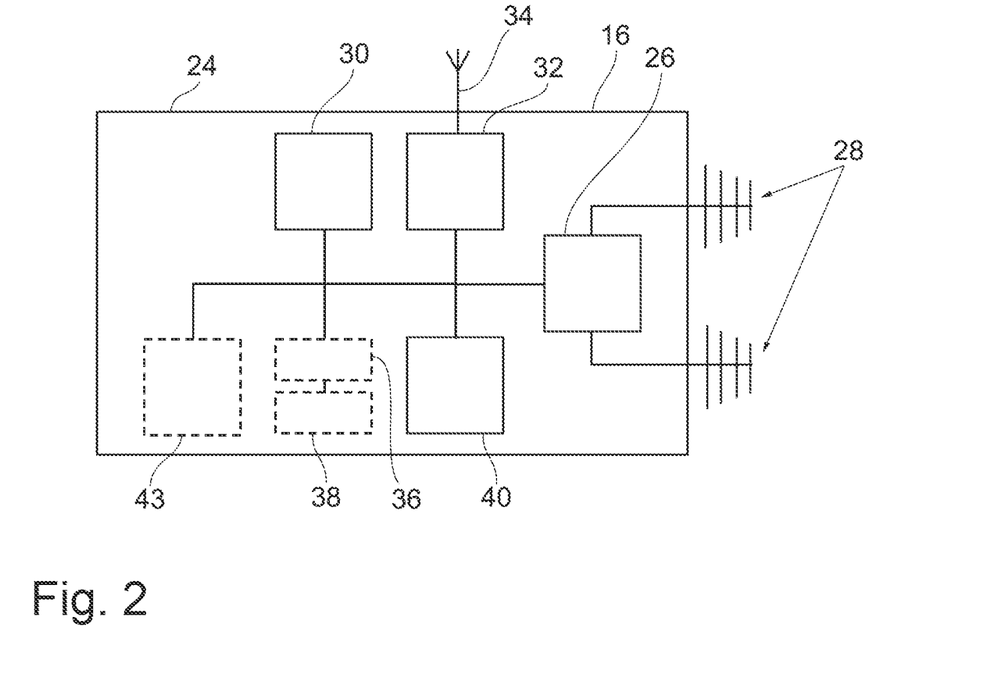
FIG. 2 shows a schematic illustration of an apparatus for determining a passing time according to the present invention.

In FIG. 2, the apparatus 16 is schematically illustrated. The apparatus 16 includes a housing 24, an RFID reader unit 26 connected to an RFID antenna 28, a location unit 30, a mobile communication unit 32 being connected to a mobile communication antenna 34 and a neighbor communication unit 40. Optionally, the apparatus 16 further comprises a battery 36 and a charging circuitry 38 for charging the battery 36. Further optionally, the apparatus 16 comprises an acceleration sensor 43. The different units can be implemented in hard- and/or software separately or in combination with one or more other units. By integrating the units in the housing 24 a protection from environmental effects such as rain/water, sun/heat or mechanical force effects is obtained.

Figures 3A, 3B:
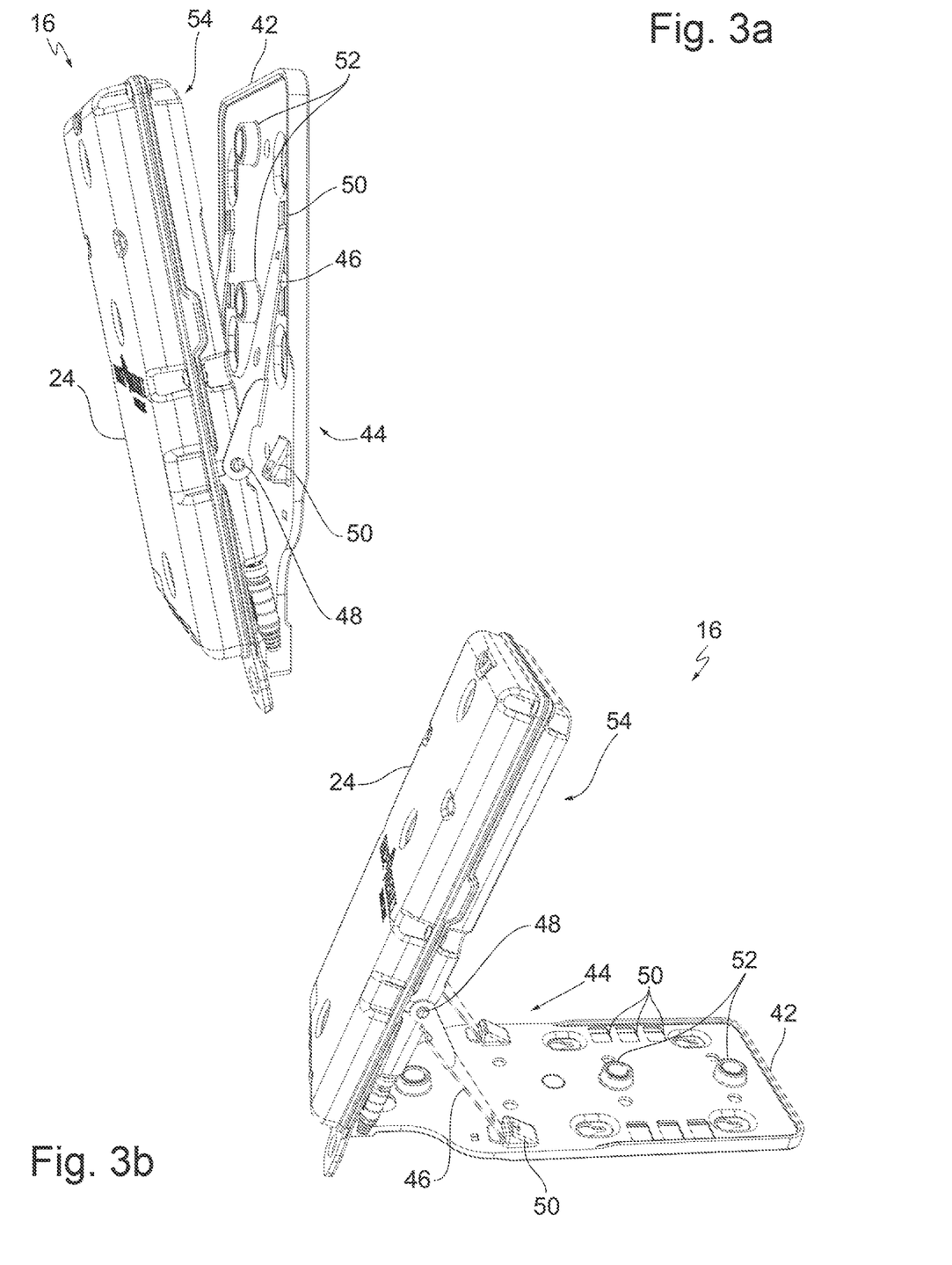
FIGS. 3a, 3b show a perspective illustration of an apparatus according to the present invention having an attachment element in two positions.

In FIGS. 3a and 3b, a preferred embodiment of the apparatus 16 is illustrated perspectively. The apparatus 16 includes an attachment element 42 that is foldable versus the housing 24 and that can be locked in at least two different positions by means of a locking mechanism. This locking mechanism 44 allows locking the attachment element 42 in different positions.

In a first position as illustrated in FIG. 3b, the attachment element 42 can be placed on the ground to form a stand for the apparatus 16. The apparatus and the RFID antenna mounted in the housing 24 then face in an inclined upward direction. This makes it possible that the apparatus 16 is placed at a side of a race track to determine passing times of sports timing transponders carried by participants passing by the apparatus 16.

In a second position as illustrated in FIG. 3a, the attachment element 42 can be fixed to a vertical support object such as a tree, a street lamp or a traffic light such that the RFID antenna in the housing 24 faces in an inclined downward direction. By placing the apparatus 16 at such a support object, the sports event can be monitored from above. In order to obtain an optimized, i.e. highest possible, read-out range of the RFID reader unit, the line-of-sight connection between the RFID antenna and the sports timing transponder is important. This line-of-sight connection can be obtained or improved by placing the apparatus 16 in an elevated position, for instance by locking the attachment element 42 in the second position so that it can form a hanging when being attached to a vertical support object. By orienting the RFID antenna in an inclined downward direction, a high detection rate can be obtained.

In the illustrated example in FIGS. 3a and 3b, the locking mechanism 44 includes a distance member 46 that is pivotably attached to the housing 24 in a pivot point 48. The distance member 46 can be hinged to multiple different rest elements 50. Thereby, the rest elements 50 can particularly be implemented in the form of cavities or recesses the distance member 46 can be hooked into (FIG. 3a), or in the form of protrusions against the distance member 46 can be placed against (FIG. 3b). As illustrated, it is possible to make multiple different angles possible by providing multiple rest elements at different positions.

In the illustrated embodiment, the attachment element 42 further includes at least one magnet 52 for attaching the apparatus 16 to a metallic object. This is particularly useful in case the attachment element 42 is locked in the second position. It then becomes possible to attach the apparatus to a metallic vertical support object such as a street lamp or a traffic light. This makes an easy and efficient installation possible. Furthermore, it is possible that the at least one magnet 52 interacts with a metallic or magnetic counterpart 53 of the housing 24 to allow a fixing of the attachment element 42 to the housing 24 when the attachment element 42 is not needed, e.g. when the apparatus 16 is transported or stored.

Figure 4A:
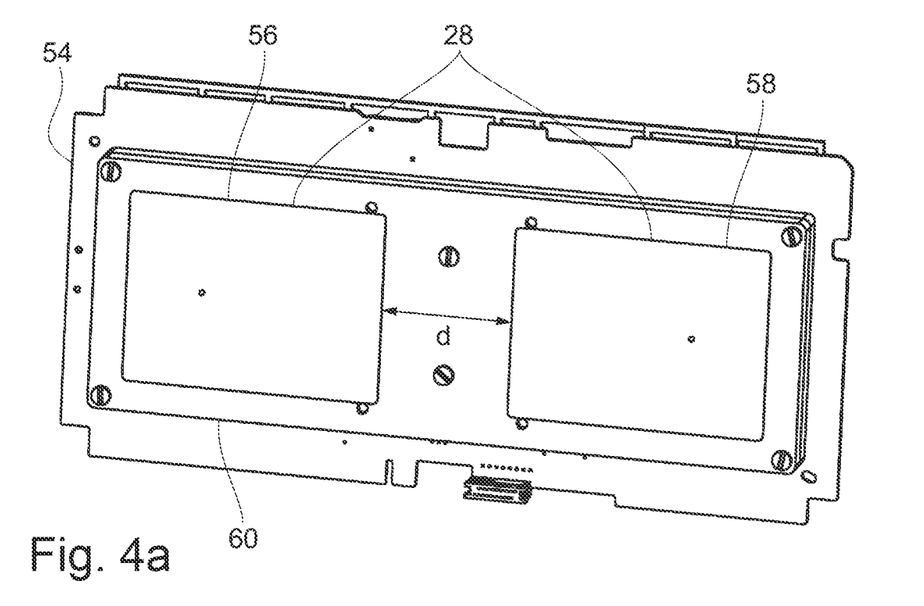
FIGS. 4a, 4b show a perspective illustration of an embodiment of a common printed circuit board having integrated the different components of the apparatus of the present invention.
Figure 4B:
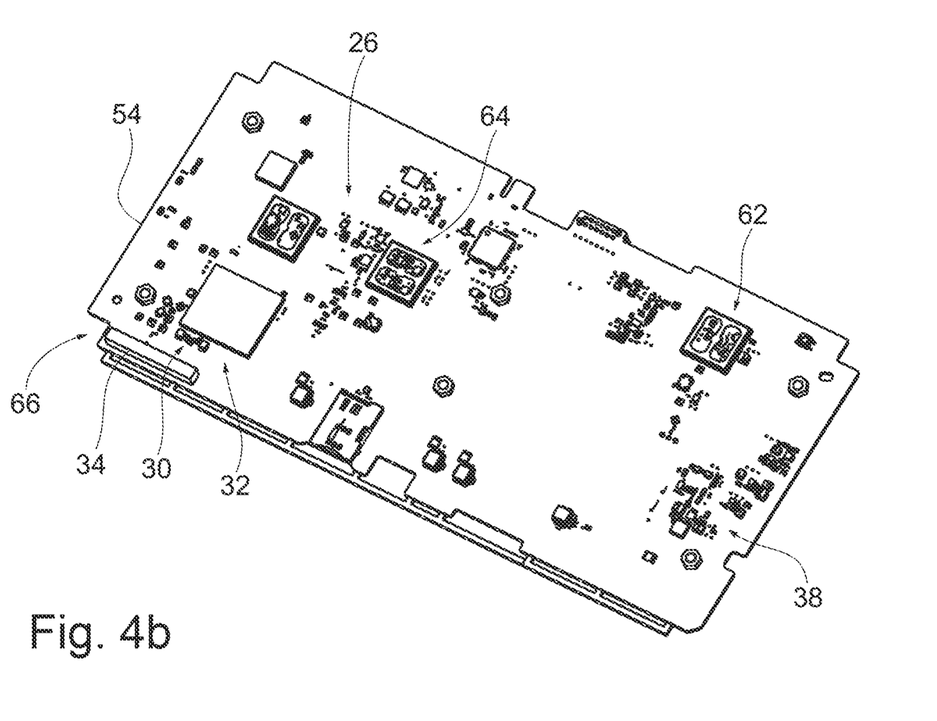

As illustrated in FIGS. 4a and 4b, the RFID reader unit 26, the RFID antenna 28, the location unit 30, the neighbor communication unit 40, the mobile communication unit 32 and the mobile communication antenna are integrated in a common printed circuit board 54 to be mounted within the housing. FIG. 4a shows the top side of the board, FIG. 4b shows the bottom side of the board. By integrating the different components in a common printed circuit board, it becomes possible to implement the apparatus 16 in a form that allows for efficient mobile application due to reduced weight and size.

In the illustrated example, the RFID antenna 28 is implemented in the form of a bistatic antenna including a transmit antenna 58 and a receive antenna 56. The transmit antenna 58 and the receive antenna 56 are patch antennas that are mounted on the side of the common printed circuit board opposite to the RFID reader unit 26. By placing the transmit antenna 58 and the receive antenna 56 on the common printed circuit board 54, it becomes possible to include a corresponding ground plane for the antennas in the common printed circuit board. As also shown in FIGS. 4a and 4b, the transmit antenna patch and the receive antenna patch can be embedded into a holding structure 60 which is made from a material that does not influence the electromagnetic waves of the activation frequency of the sports timing transponders.

The geometric arrangement of the transmit antenna 58, the receive antenna 56 and the ground plane is chosen so that crosstalk between the antennas is minimized. In particular, a distance d between the transmit antenna 58 and the receive antenna 56 as well as the orientation and alignment of the antennas (patches) is chosen in consideration of the activation frequency of the sports timing transponder. By minimizing crosstalk, it becomes possible to obtain a better sensitivity and a higher detection range and thereby optimize the detection rate. Further, the optimization of the geometric arrangements has the effect that less or no carrier cancelation is required which also leads to energy savings in the carrier cancellation circuitry.

In order to compensate for dynamic crosstalk between the transmit antenna 58 and the receive antenna 56, the common printed circuit board 54 includes a carrier cancellation circuitry 64, forming part of the RFID reader unit 26. This carrier cancellation circuitry 64 is particularly useful for compensating varying environmental conditions. For instance, if the apparatus 16 is attached to a metal object, such as a traffic light or the like, this object can interfere with the RFID antenna. In particular, crosstalk can be amplified. This effect cannot be compensated for in advance, since it depends on the current environmental conditions. For this, the carrier cancellation circuitry 64 can be used to cancel a remaining crosstalk.

The mobile communication unit 32 can particularly include a 4G- or 5G-module for communicating via a corresponding mobile communication network. It is, however, also possible that the mobile communication unit 32 makes use of another communication modality/standard and/or another suitable network for communicating over a longer range. The mobile communication antenna 34 is placed in a position on the common printed circuit board 54 in which crosstalk between the RFID antenna 28 and the mobile communication antenna 34 is minimized. This is particularly important for the signal-to-noise ratio of the mobile communication antenna 34.

In addition to positioning the mobile communication antenna 34 and the RFID antenna 28 versus one another so that crosstalk is minimized, the illustrated embodiment further includes a band-stop filter 66 being integrated in a feed line of the mobile communication antenna 34. This band-stop filter 66 allows filtering out an activation frequency of the sports timing transponder from the mobile communication antenna 34. Thereby, the communication capability of the mobile communication unit 32 is improved. It becomes possible to simultaneously use the mobile communication unit 32 and the RFID reader unit 26.

In the illustrated embodiment in FIGS. 4a and 4b, the location unit 30 is implemented in the form of a GPS-receiver that is integrated with the mobile communication unit 32. Further, the common printed circuit board 54 includes an acceleration sensor 43. This acceleration sensor 43 allows determining an orientation of the apparatus 16. By making use of the signal of the acceleration sensor 43, it becomes possible to further save power. In particular, the RFID reader unit 26 is usually the component that consumes the highest amount of power. This RFID reader unit 26 is, however, only needed when sports timing transponders are passing by and have to be read out. In case the apparatus 16 is not in use, the RFID reader unit 26 can be deactivated. This deactivation can be controlled by means of the acceleration sensor 43. If the apparatus is put into a rest position, for instance if the apparatus is laid flat on the ground, the RFID reader unit 26 (as well as other units) can be deactivated or put into a power-saving mode. Thus, no interaction of a user of the apparatus is required in order to put the apparatus into a power-saving mode. No button has to be pressed. It is sufficient to put the apparatus into a predefined orientation. In the illustrated embodiment in FIGS. 3 and 4, it can be seen that the housing 24 actually covers the patches of the transmit antenna 58 and the receive antenna 56. Since this covering could result in a degradation of the RFID range or detection rate, if not compensated for, it is advantageous if a spacer element is used to define a distance between the portion of the housing covering the RFID antenna. This spacer element can particularly be implemented in the form of a protruding part of the housing at inappropriate locations. Still further, as illustrated in FIGS. 4a and 4b, the neighbor communication unit 40 is integrated in the common printed circuit board 54. In the illustrated embodiment the neighbor communication unit 40 is implemented in the form of a 2.4 GHz transceiver corresponding to a short-distance communication unit. The neighbor communication unit 40 allows two similar apparatuses to communicate with one another when within communication range. It is to be understood that it is also possible to integrate the neighbor communication unit 40 with the mobile communication unit and provide the synchronization functionality via a mobile communication connection (e.g. via the internet or via a mobile communication network).

Figure 5:
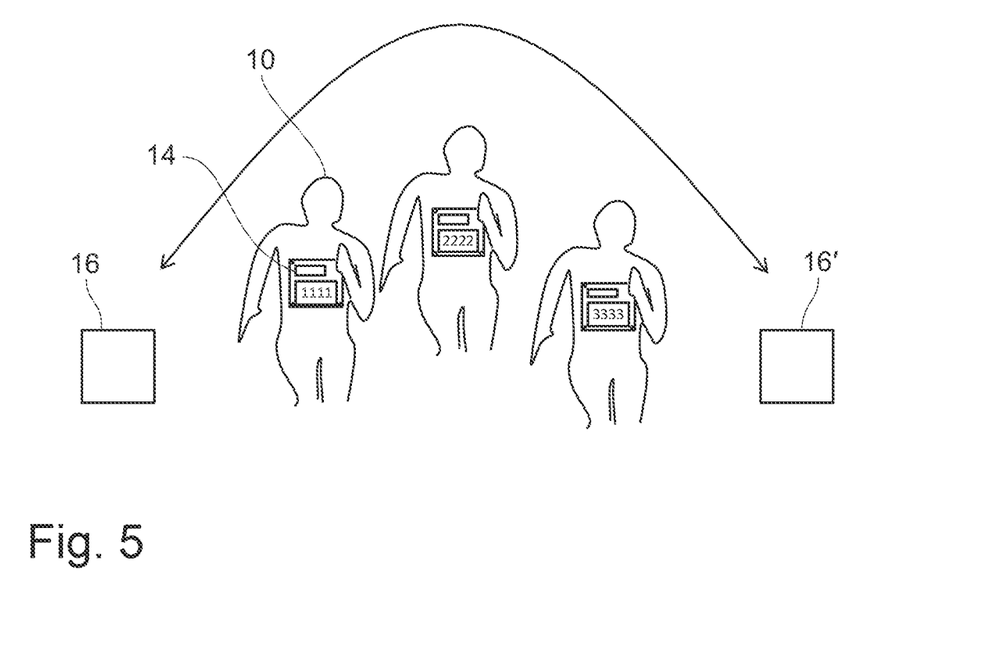
FIG. 5 shows a schematic illustration of a synchronization between two similar apparatuses within immediate spatial vicinity.

The functionality of the neighbor communication unit 40 is explained based on FIG. 5. A situation is illustrated in which two apparatuses 16, 16' are used in immediate spatial vicinity of one another. The two apparatuses 16, 16' can, e.g., be positioned on both sides of a race track wherein the participants 10 of the sports event carry their sports timing transponders 14 over the race track passing between the two apparatuses 16, 16'. By making use of two apparatuses 16, 16', it becomes possible to obtain a high detection rate, since shadowing effects resulting from human body parts between the sports timing transponder 14 and the apparatuses 16, 16' leading to missed detections can be minimized. At least one of the apparatuses 16, 16' has a good view on a sports timing transponder 14 and can read the transponder. However, one drawback of placing two apparatuses 16, 16' close to one another (in immediate spatial vicinity) is that the RFID reader units will interfere with one another. It is not possible to simultaneously read out a passive RFID tag with two readers. This can result in a reduced detection rate (or no detection at all) and a reduced timing accuracy. To nevertheless be able to operate the two apparatuses 16, 16' within RFID range of one another, the previously described neighbor communication unit can be used to synchronize the operation of the RFID reader units so that interference is avoided. A high detection range can be obtained.

In particular, it is possible that messages are exchanged between the apparatuses 16, 16' via their neighbor communication units in which activation times are negotiated. For the synchronization, different protocols can be used. In particular, it is useful in this respect to make use of a protocol that allows the simultaneous operation of at least four apparatuses within communication range of one another. Thereby, the used communication protocol has to take hidden-terminal-problems into account.

Preferably, a broadcast-based approach that is carried out via a short distance communication unit is used. A pathologic case consists in a (long) chain of apparatuses with every apparatus in the chain being able to communicate only with its immediate neighbors. The optimal solution in this case would be to simultaneously activate the RFID reader unit of every second apparatus in the chain. One preferred approach in this respect includes that one apparatus broadcasts a deactivation message when deactivating its RFID reader unit. The other apparatus can then broadcast an activation message within or after an individually determined wait time and activate its RFID reader unit after having sent the activation message. This individually determined wait time can particularly be based on a number of other similar apparatuses within communication range and/or a duration since the last broadcast of an activation message.

Figure 6:
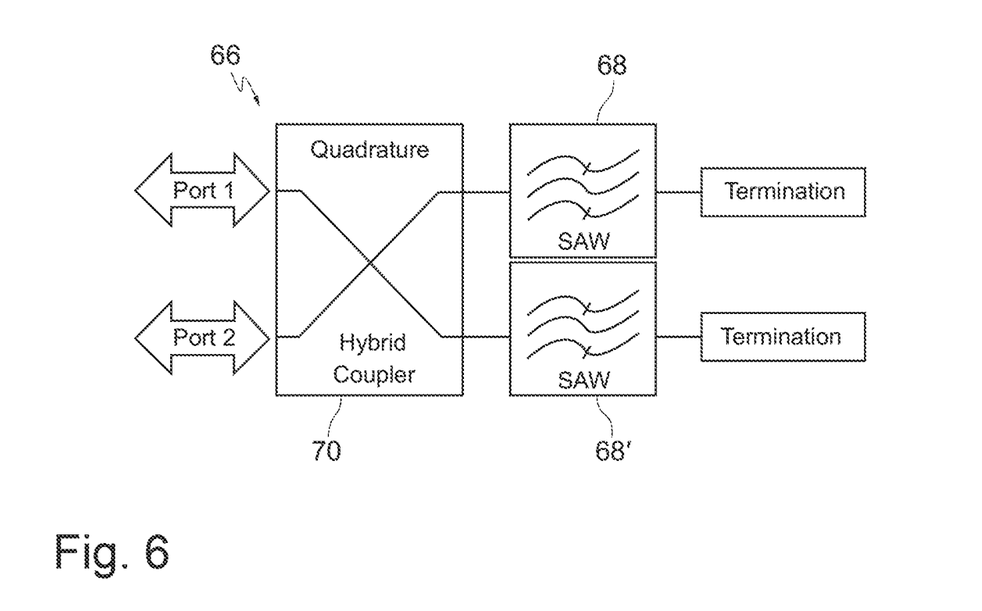
FIG. 6 shows a schematic illustration of an implementation of a notch filter.

FIG. 6 schematically illustrates an implementation of the band-stop filter 66. The band-stop filter 66 allows filtering out an activation frequency when being placed in a feed line of the mobile communication antenna. It is to be understood that the band-stop filter 66 can also be used in other applications and modified to accommodate different frequencies. The band-stop filter 66 has the effect that a frequency band can be suppressed. As illustrated in the schematics in FIG. 6, it is possible to implement the band-stop filter 66 based on two band-pass filters 68, 68' corresponding to SAW filters and a hybrid coupler 70. This configuration works as a notch filter allowing to find an accurate suppression of a desired frequency band.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the description is intended to be illustrative, but not limiting the scope of the disclosure, as well as other claims. The disclosure, including any readily discernible variants of the teachings herein, defines, in part, the scope of the foregoing claim terminology such that no inventive subject-matter is dedicated to the public. In the claims, the word "comprising" does not exclude other elements or steps, and the indefinite article "a" or "an" does not exclude a plurality. A single element or unit may fulfill the functions of several items recited in the claims. The mere fact that certain measures are recited in mutually different dependent claims does not indicate that a combination of these measures cannot be used to advantage.

The elements and units of the disclosed apparatuses, devices, circuitry and system may be implemented by corresponding hardware and/or software elements, for instance appropriated circuits. A circuit is a structural assemblage of electronic components including conventional circuit elements, integrated circuits including application-specific integrated circuits, standard integrated circuits, application-specific standard products, and field programmable gate arrays. Further a circuit includes central processing units, graphics processing units, and microprocessors which are programmed or configured according to software code. A circuit does not include pure software, although a circuit includes the above-described hardware executing software.

What is claimed is:

1. An apparatus for determining a passing time of a passive radio frequency identification (RFID) sports timing transponder, comprising:
   a housing for protecting the apparatus from environmental effects;
   an RFID reader unit connected to an RFID antenna for remotely determining an identity and the passing time of the sports timing transponder upon passing the apparatus;
   a location unit for determining a location of the apparatus;
   a mobile communication unit connected to a mobile communication antenna for transmitting the identity and the passing time of the sports timing transponder and the location of the apparatus to a remote processing unit; and
   a neighbor communication unit configured to communicate with another similar apparatus in an immediate spatial vicinity to synchronize operation of the RFID reader unit and an RFID reader unit of the other similar apparatus to avoid interference, wherein
   the RFID reader unit, the RFID antenna, the location unit, the mobile communication unit and the neighbor communication unit are integrated within the housing; and
   the neighbor communication unit is a short distance communication unit, with which messages are exchanged with a neighbor communication unit of the other similar apparatus to negotiate activation times.

2. The apparatus of claim 1, wherein the RFID reader unit and the RFID antenna are integrated in a common printed circuit board that is mounted within the housing.

3. The apparatus of claim 2, wherein a ground plane of the RFID antenna is integrated in the common printed circuit board.

4. The apparatus of claim 3, wherein the RFID reader unit includes a carrier cancellation circuitry to cancel remaining crosstalk between the transmit antenna and the receive antenna.

5. The apparatus of claim 2, wherein the RFID antenna is a bistatic antenna and includes a transmit antenna and a receive antenna that are mounted on the common printed circuit board.

6. The apparatus of claim 5, wherein the transmit antenna and the receive antenna are mounted on the common printed circuit board on an opposite side of the common printed circuit board of the RFID reader unit.

7. The apparatus of claim 5, wherein the RFID antenna is a bistatic patch antenna including a transmit antenna patch and a receive antenna patch.

8. The apparatus of claim 2, wherein a geometric arrangement, in particular a distance and an alignment, of the transmit antenna and the receive antenna minimize crosstalk between the transmit antenna and the receive antenna at an activation frequency of the sports timing transponder.

9. The apparatus of claim 1, wherein the short distance communication unit is a 2.4 GHz transceiver.

10. The apparatus of claim 1, wherein the neighbor communication unit is configured to broadcast a deactivation message when deactivating the RFID reader unit;
broadcast an activation message if the activation message is not received from the other similar apparatus within an individually determined wait time; and
activate the RFID reader unit upon receipt of the deactivation message from the other similar apparatus when the activation message was sent,
wherein the individually determined wait time is preferably determined based on at least one of a number of other similar apparatuses within communication range of the neighbor communication unit or a duration since the last broadcast of the activation message.

11. The apparatus of claim 1, wherein the mobile communication unit includes a band-stop filter located in a feed line of the mobile communication antenna to filter out an activation frequency of the sports timing transponder.

12. The apparatus of claim 11, wherein the band-stop filter includes two band-pass filters and a hybrid coupler to function as a notch filter.

13. The apparatus of claim 1, wherein the mobile communication antenna and the RFID antenna are integrated in a common printed circuit board and positioned on the common printed circuit board so that crosstalk is minimized.

14. The apparatus of claim 1, comprising
at least one spacer element for defining a distance between a portion of the housing covering the RFID antenna and the RFID antenna.

15. The apparatus of claim 14, wherein the at least one spacer element is a protruding part of the housing.

16. The apparatus of claim 1, comprising
an acceleration sensor for detecting an orientation of the apparatus, wherein
at least one of the RFID reader unit or the location unit is configured to enter a stand-by mode or a power down mode when the acceleration sensor detects that the apparatus is put into a predefined stand-by orientation.

17. The apparatus of claim 1, comprising an attachment element that is foldable versus the housing and that can be locked in at least two different positions by a locking mechanism.

18. The apparatus of claim 17, wherein the locking mechanism includes a distance member hinged to at least one corresponding rest element of the attachment element to define a distance between the attachment element and the housing.

19. The apparatus of claim 17, wherein the attachment element can be locked in a first position and a second position,
wherein when in the first position, the attachment element is placed on the ground forming a stand for the apparatus to orient the RFID antenna (28) in an inclined upward direction; and
wherein when in the second position, the attachment element is fixed to a vertical support object and hung to orient the RFID antenna in an inclined downward direction.

20. The apparatus of claim 17, wherein the attachment element includes at least one magnet for attaching the apparatus to a metallic object.

21. The apparatus of claim 20, wherein the magnet is configured to attach to a metallic or magnetic counterpart of the housing to fix the attachment element to the housing in a rest position.

22. A system for timing a sports event, comprising:
a passive radio frequency identification (RFID) sports timing transponder;
an apparatus for determining a passing time of the passive RFID sports timing transponder, the apparatus comprising:
a housing for protecting the apparatus from environmental effects;
an RFID reader unit connected to an RFID antenna for remotely determining an identity and the passing time of the sports timing transponder upon passing the apparatus;
a location unit for determining a location of the apparatus;
a mobile communication unit connected to a mobile communication antenna for transmitting the identity and the passing time of the sports timing transponder and the location of the apparatus to a remote processing unit; and
a neighbor communication unit configured to communicate with another similar apparatus in an immediate spatial vicinity to synchronize operation of the RFID reader unit and an RFID reader unit of the other similar apparatus to avoid interference, wherein the RFID reader unit, the RFID antenna, the location unit, the mobile communication unit and the neighbor communication unit are integrated within the housing and the neighbor communication unit is a short distance communication unit, with which messages are exchanged with a neighbor communication unit of the other similar apparatus to negotiate activation times; and
the remote processing unit configured to receive the identity and the passing time of the sports timing transponder and the location of the apparatus, and for evaluating passing times of participants in the sports event based on the identity, the passing time and the location.

\* \* \* \* \*